Patented Oct. 7, 1941

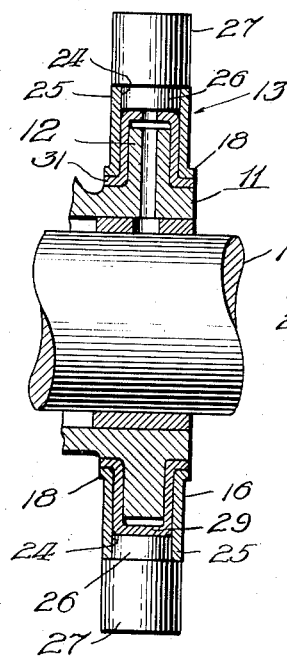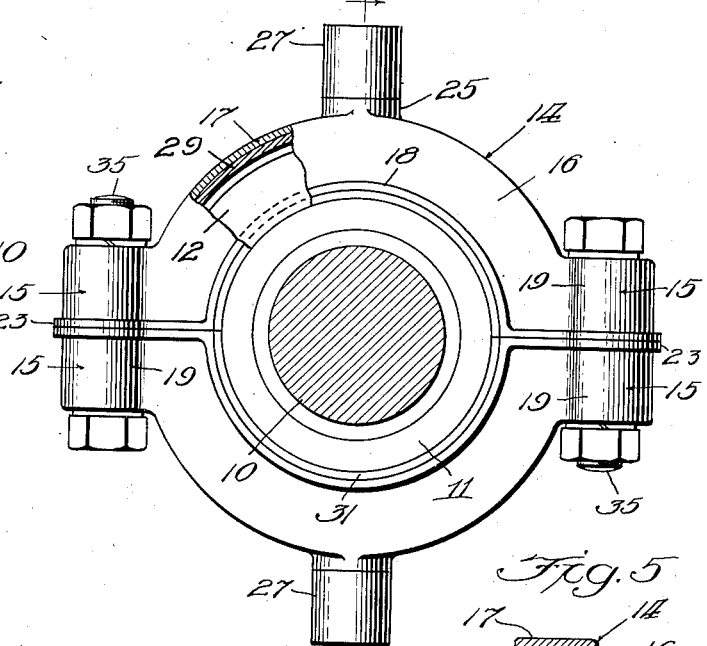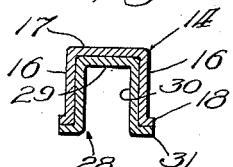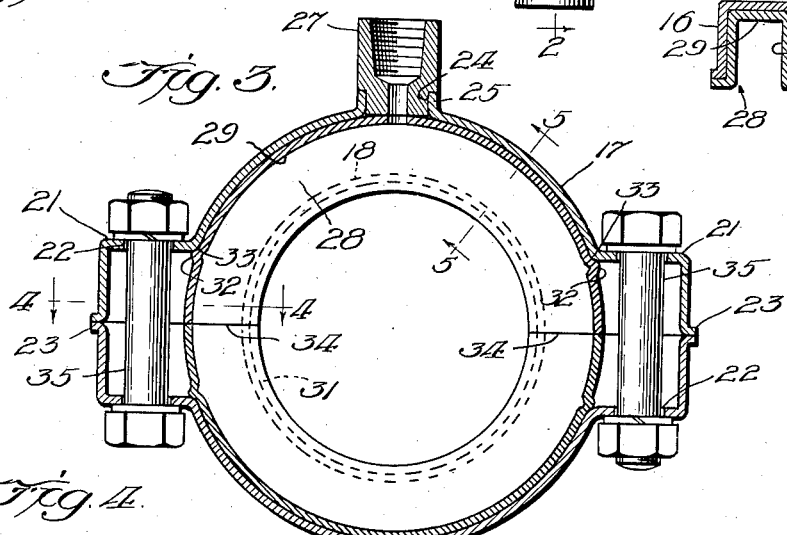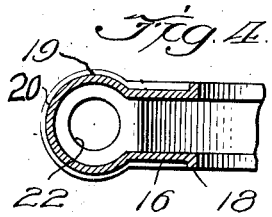

2,258,345

UNITED STATES PATENT OFFICE 2,258,345

CLUTCH THROWOUT COLLAR

Nicholas F. Adamson, Racine, Wis., assignor to Twin Disc Clutch Company, Racine, Wis., a corporation of Wisconsin Application May 29, 1940, Serial No. 337,859

7 Claims. (Cl. 192—98)

My invention relates to a throwout collar for clutches which is characterized by greater strength and lower manufacturing and maintenance costs than those heretofore employed.

Present collars are generally cast and quite frequently are made of phosphor bronze which is a relatively expensive alloy. A further objection to cast collars is that, in the event of breakage or more than allowable wear in the bearing face thereof, the entire collar must be discarded, thus increasing the maintenance cost. Moreover, cast collars do not possess that strength and durability which best design standards require.

It is therefore the principal object of my invention to provide a throwout collar that is economical to manufacture by reason of being stamped from sheet metal and which is shaped to insure a substantial increase in strength over cast collars.

A further object is to devise a collar of the character indicated, in which the bearing inserts are secured to the stamped collar so that they may be readily replaced in the event of wear or breakage.

These and further objects of my invention will be set forth in the following specification, reference being had to the accompanying drawing, and the novel means by which said objects are effectuated will be definitely pointed out in the claims.

In the drawing:

Fig. 1 is an elevation of my improved collar, partly in section, showing the same in operative relation to the actuating sleeve of a clutch structure.

Fig. 2 is a section along the line 2—2 in Fig. 1.

Fig. 3 is a sectional elevation of the collar, as viewed in Fig. 1, the allied clutch structure being omitted.

Figs. 4 and 5 are sections along the lines 4—4 and 5—5, respectively, in Fig. 3, the first named view omitting the bearing insert.

Referring to the drawing, the numeral 10 designates a shaft which may be either the driving or driven element of a clutch construction and on which is slidably mounted the usual shiftable sleeve 11 that is intended to actuate the clutch (not shown) in the well-known manner. The sleeve 11 is provided with the customary annular flange 12 which is embraced by my improved collar 13 for the purpose of moving the sleeve 11 in axial directions. The parts above described, except the collar 13, form no part of the present invention, but have been adverted to as showing a typical operating environment.

Generally speaking, my improved collar comprises a pair of complementary stampings, each of which is composed of an intermediate yoke portion 14 from the ends of which extend in opposite directions straight portions 15. The yoke is channel shaped in cross-section and comprises a pair of flat, parti-annular walls 16 which are connected by an outer peripheral wall 17 to thereby form a pocket for receiving the bearing inserts presently described. The inner or exposed edges of the walls 16 are preferably outwardly flanged as at 18.

The side walls 16 are continued to form the side walls 19 of the straight portions 15 which are also shaped with a U-section, and the last named side walls are continued to form a curved end wall 20 to close the ends of the stamping and increase its strength in this locality. The side walls 19 are connected by a wall 21 which is a continuation of the peripheral wall 17 and the wall 21 may be perforated as at 22 to receive the securing bolts hereinafter described. The inner or exposed edges of the side walls 19 are also outwardly flanged as at 23 and these flanges are continuations of the flanges 18.

The wall 17 is intermediately apertured, as at 24, and this aperture is defined by a surrounding and outwardly extending flange 25 for receiving and tightly fitting a reduced portion 26 provided on a trunnion pin 27, it being understood that the trunnion pin mounted in the other stamping is diametrically related to the trunnion pin just described.

A parti-annular bearing insert 28 composed of suitable anti-friction material and possessing a U-shaped cross-section fits closely within the pocket provided in each yoke portion 14 and comprises a peripheral wall 29 which seats against the inner surface of the wall 17 and flat, parti-annular side walls 30 which contact the inner surfaces of the side walls 16, and also outwardly extending flanges 31 which engage the inner surfaces of the flanges 18.

Each stamping is preferably made from strip metal of an appropriate gauge and drawn at a single operation to form each stamping. For this purpose, strip steel of No. 16 gauge (.062″) has been found satisfactory and in a collar in which the outer radius of the yoke portion of each stamping is of the order of $1\frac{5}{8}$ inches, and the length and width of the stamping of the order of $4\frac{9}{16}$ inches and ½ inch, respectively, both dimensions being approximate, it has been ascertained that a steel strip having a width of 1¾ to 2 inches can be drawn to make each stamping, after which the stamping can be trimmed to the finished size. The bearing insert is also preferably stamped from strip or sheet metal.

The bearing inserts 28 are pressed into the yoke portions 14 while the trunnion pins 27 are preferably brazed in position and it will be noted that this construction, in the event of breakage or excessive wear of the insert, enables the latter to be readily removed without affecting the capacity of the stamping proper to receive new elements of this character. Rotation of the inserts is prevented by bosses 32 formed on the insert wall 29 which engage the shoulder 33 at the junction of the walls 17 and 21. After the inserts and trunnion pins have been mounted in the stampings, the latter are assembled with their flanges 23 and the edges 34 of the bearing inserts, respectively, in abutting relation, and the assembly can then be secured together by bolts 35 which extend through the apertures 22.

The annular flange 25 provides adequate surface for securing a strong brazing bond with the trunnion pin 27 and these flanges serve to strengthen the general construction in that they furnish a resistance to sidewise thrusts to which the trunnion pins are subjected. Similarly, the opposed faces of the flanges 23 provide strong abutting surfaces for the complementary stampings and preferably these surfaces are located along the diameter of the completed collar, although it is contemplated that this division line between the stampings may be positioned at some convenient distance offset from the diameter of the collar without departing from the concept involved in the design.

The principal advantages of my improved construction relative to cast collars are those of low manufacturing and maintenance costs, and superior strength. As noted above, the common practice in the industry is to employ phosphor bronze castings for collars of this nature, but a casting of this alloy having the dimensions mentioned above costs approximately thirty-four cents, and to this expense must be added the machining cost of about eight cents. With my improved collar, however, it is possible to reduce the manufacturing cost to about twenty-five cents and this cost includes the finished stampings, bearing inserts and the trunnion pins, including the securing of these parts in position. The trunnion pins which are preferably formed of steel are less subject to wear and breakage than the integrally cast pins heretofore employed.

I claim:

1. A throwout collar for clutches comprising a pair of identical, complementary stampings abutting along the diameter of the collar, each stamping including a pocket for receiving a part bearing insert and an aperture diametrically related to the aperture in the other stamping, a trunnion pin mounted in each aperture, and means for securing the stampings together.

2. A throwout collar for engaging the annular flange on a clutch actuating sleeve comprising a pair of identical, complementary stampings, each stamping having a substantially U-shaped cross-section and being composed of an intermediate yoke portion and straight portions extending oppositely from the ends of the yoke portion, the straight portions having curved end walls forming a continuation of the side walls of the yoke portion and the oppositely extending edges of the straight portions abutting the corresponding edges of the other stamping along a diameter of the collar, a part bearing insert externally shaped to fit snugly within the yoke portion and internally formed to receive a part of the flange, and securing means extending through the straight portions.

3. A throwout collar for clutches comprising a pair of complementary stampings each including a pocket for receiving a part bearing insert and an aperture diametrically related to the aperture in the other stamping, a trunnion pin mounted in each aperture; and means for securing the stampings together.

4. A throwout collar for engaging the annular flange on a clutch actuating sleeve comprising a pair of identical, complementary stampings, each stamping having a substantially U-shaped cross-section and being composed of an intermediate yoke portion and straight portions extending oppositely from the ends of the yoke portion, the side walls and connecting wall of each straight portion being formed by a continuation of the side walls and peripheral wall of the yoke portion, respectively, and the outer ends of the straight portion side walls being connected by an end wall, a part bearing insert externally shaped to fit snugly within the yoke portion and internally formed to receive a part of the flange and securing means extending through apertures provided in the connecting walls.

5. A throwout collar for clutches comprising a pair of identical, complementary stampings abutting along the diameter of the collar, each stamping including a pocket for receiving a part bearing insert and a flanged aperture diametrically related to the flanged aperture in the other stamping, a trunnion pin fitting within each aperture flange and secured thereto, and means for securing the stampings together.

6. A throwout collar for clutches comprising a pair of complementary stampings each including a pocket for receiving a part bearing insert and a flanged aperture diametrically related to the flanged aperture in the other stamping, a trunnion pin fitting within each aperture flange and secured thereto, and means for securing the stampings together.

7. A stamping adapted to form a part of a clutch throwout collar having a pocket for receiving a part bearing insert and an aperture diametrically related to the trunnion pin in the other part of the collar, and a trunnion pin mounted in the aperture.

NICHOLAS F. ADAMSON.